United States Patent
Sawada

(10) Patent No.: US 12,469,270 B2
(45) Date of Patent: Nov. 11, 2025

(54) INFERENCE DEVICE, INFERENCE METHOD, AND A NON-TRANSITORY COMPUTER-READABLE MEDIUM

(71) Applicant: Mitsubishi Electric Corporation, Tokyo (JP)

(72) Inventor: Tomoya Sawada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/028,995

(22) PCT Filed: Aug. 2, 2022

(86) PCT No.: PCT/JP2022/029597
§ 371 (c)(1),
(2) Date: Mar. 28, 2023

(87) PCT Pub. No.: WO2023/074075
PCT Pub. Date: May 4, 2023

(65) Prior Publication Data
US 2024/0362901 A1    Oct. 31, 2024

(51) Int. Cl.
*G06V 10/82* (2022.01)
*G06V 10/22* (2022.01)
(Continued)

(52) U.S. Cl.
CPC .............. *G06V 10/82* (2022.01); *G06V 10/22* (2022.01); *G06V 10/62* (2022.01); *G06V 10/761* (2022.01);
(Continued)

(58) Field of Classification Search
CPC ...... G06V 10/82; G06V 10/96; G06V 10/761; G06V 10/62; G06V 10/22; G06V 10/774;
(Continued)

(56) References Cited

U.S. PATENT DOCUMENTS 11,189,367 B2 *   11/2021   Lisowska ............... G16H 50/70
12,277,192 B1 *    4/2025   Venkatesan .......... G06V 10/764
(Continued)

FOREIGN PATENT DOCUMENTS

EP          3916628 A1 *  12/2021   ............. G06N 3/045
JP       2018-205858 A    12/2018
(Continued)

OTHER PUBLICATIONS

Chen; Miaomiao et al. "Research of X-Ray Image Recognition Based on Neural Network", Nov. 2018, IEEE (Year: 2018).*
(Continued)

*Primary Examiner* — John Villecco
*Assistant Examiner* — Alejandro Hernandez
(74) *Attorney, Agent, or Firm* — Birch, Stewart, Kolasch & Birch, LLP

(57) ABSTRACT

An image signal indicating an inference target image in which a detection target appears is acquired when a domain of the inference target image is different from a domain of a training image or a recognition task of the inference target image is different from a pre-learned task. The image signal is provided to a trained learning model, and from the learning model, an inference time feature amount obtained by combining feature amounts of the detection target in the inference target image after the feature amounts is blurred is acquired. The detection target in the inference target image is recognized on the basis of a representative feature amount that is a registered feature amount of the detection target in an image for conversion in which a domain and a recognition task of the image are the same as those of the inference target image, and the inference time feature amount.

9 Claims, 11 Drawing Sheets

(51) Int. Cl.
  *G06V 10/62* (2022.01)
  *G06V 10/74* (2022.01)
  *G06V 10/764* (2022.01)
  *G06V 10/774* (2022.01)
  *G06V 10/96* (2022.01)

(52) U.S. Cl.
  CPC .......... *G06V 10/764* (2022.01); *G06V 10/774* (2022.01); *G06V 10/96* (2022.01)

(58) Field of Classification Search
  CPC .... G06V 10/764; G06V 10/771; G06V 10/77; G06V 10/70; G06T 7/73; G06N 3/02; G06N 3/08; G06N 3/09
  See application file for complete search history.

(56) References Cited

U.S. PATENT DOCUMENTS

| | | | | |
|---|---|---|---|---|
| 2009/0110303 | A1* | 4/2009 | Nishiyama | G06V 10/20 382/260 |
| 2017/0017859 | A1* | 1/2017 | Uchiyama | G06F 18/256 |
| 2019/0303746 | A1* | 10/2019 | Saruta | G06N 3/045 |
| 2020/0364570 | A1 | 11/2020 | Kitamura | |
| 2022/0092475 | A1 | 3/2022 | Sogawa et al. | |
| 2022/0138454 | A1* | 5/2022 | Zhao | G06F 18/214 382/156 |
| 2022/0358835 | A1* | 11/2022 | Graver | G08G 1/0116 |
| 2023/0016472 | A1* | 1/2023 | Nguyen | G06V 20/69 |
| 2023/0177808 | A1* | 6/2023 | Kappagantula | G06N 3/045 382/157 |
| 2024/0114254 | A1* | 4/2024 | Tadano | G06T 7/11 |
| 2024/0289695 | A1* | 8/2024 | Asatani | G06N 3/08 |
| 2024/0331375 | A1* | 10/2024 | Kanaujia | G06V 10/82 |
| 2024/0346812 | A1* | 10/2024 | Kim | G06V 10/776 |

FOREIGN PATENT DOCUMENTS

| | | | |
|---|---|---|---|
| JP | 2019-185127 A | 10/2019 | |
| JP | 2019-211913 A | 12/2019 | |
| JP | 2020-119154 A | 8/2020 | |
| WO | WO 2019/167884 A1 | 9/2019 | |
| WO | WO 2020/144853 A1 | 7/2020 | |
| WO | WO-2022113534 A1 * | 6/2022 | ............. G06N 3/096 |

OTHER PUBLICATIONS

Chen; Yuhua et al. "Domain Adaptive Faster R-CNN for Object Detection in the Wild", Jun. 2018, IEEE (Year: 2018).*

* cited by examiner

INFERENCE DEVICE, INFERENCE METHOD, AND A NON-TRANSITORY COMPUTER-READABLE MEDIUM

TECHNICAL FIELD

The present disclosure relates to an inference device, an inference method, and non-transitory computer readable medium.

BACKGROUND ART

There is a learning device that learns a multilayer neural network (hereinafter referred to as "multilayer NN") as a device that efficiently learns a neural network in a case where the amount of training data in an adapted domain is small (See, for example, Patent Literature 1). The domain means the type of the image indicated by the training data, and for example, an RGB image and an infrared camera image (hereinafter referred to as "TIR image") are different from each other in the type of the image.

The learning device includes a first learning means, a first generation means, and a second learning means. The first learning means learns a first multilayer NN using a first data group. The first generation means generates a second multilayer NN between a first layer and a second layer subsequent to the first layer in the first multilayer NN. The second learning means learns a second multilayer NN by using a second data group having a characteristic different from that of the first data group. Each of the first data group and the second data group is training data.

CITATION LIST

Patent Literature

Patent Literature 1: JP 2019-185127 A

SUMMARY OF INVENTION

Technical Problem

In the learning device disclosed in Patent Literature 1, in some cases, a task corresponding to training data is different from a task at the time of inference in which output data of a neural network is acquired and inference is performed. For example, when the task corresponding to the training data is an image recognition task and the task at the time of inference is an object recognition task, the task corresponding to the training data and the task at the time of inference are different. In addition, the domain of the image indicated by the training data may be different from the domain of the image at the time of inference. In a case where either the task or the domain is different, there is a problem that the accuracy of inference by the task at the time of inference may be deteriorated.

The present disclosure has been made to solve the above-described problem, and an object of the present disclosure is to obtain an inference device capable of suppressing the degradation of the inference accuracy even in a case where one or more of a task and a domain are different.

Solution to Problem

An inference device according to the present disclosure includes processing circuitry to acquire an image signal indicating an inference target image that is an image in which a detection target object appears in a case where one or more of a condition that a domain of the inference target image is different from a domain of a training image and a condition that a recognition task of the inference target image is different from a pre-learned task are satisfied, and to provide the image signal to a learning model in which learning of the training image has been completed, and acquire, from the learning model, an inference time feature amount that is obtained by combining a plurality of feature amounts of the detection target object appearing in the inference target image after each of the plurality of feature amounts is blurred. The processing circuitry further recognizes the detection target object appearing in the inference target image on a basis of a representative feature amount that is a registered feature amount of the detection target object appearing in an image for conversion in which each of a domain and a recognition task of the image is the same as that of the inference target image, and the inference time feature amount.

Advantageous Effects of Invention

According to the present disclosure, even in a case where one or more of a task and a domain are different, it is possible to suppress the degradation of the inference accuracy.

BRIEF DESCRIPTION OF DRAWINGS

FIG. 3 is a hardware configuration diagram of a computer in a case where the inference device 3 is implemented by software, firmware, or the like.

FIG. 6 is a hardware configuration diagram of a computer in a case where the learning device 6 is implemented by software, firmware, or the like.

DESCRIPTION OF EMBODIMENTS

In order to explain the present disclosure in more detail, some embodiments for carrying out the present disclosure will be described below with reference to the accompanying drawings.

First Embodiment

Figure 1:
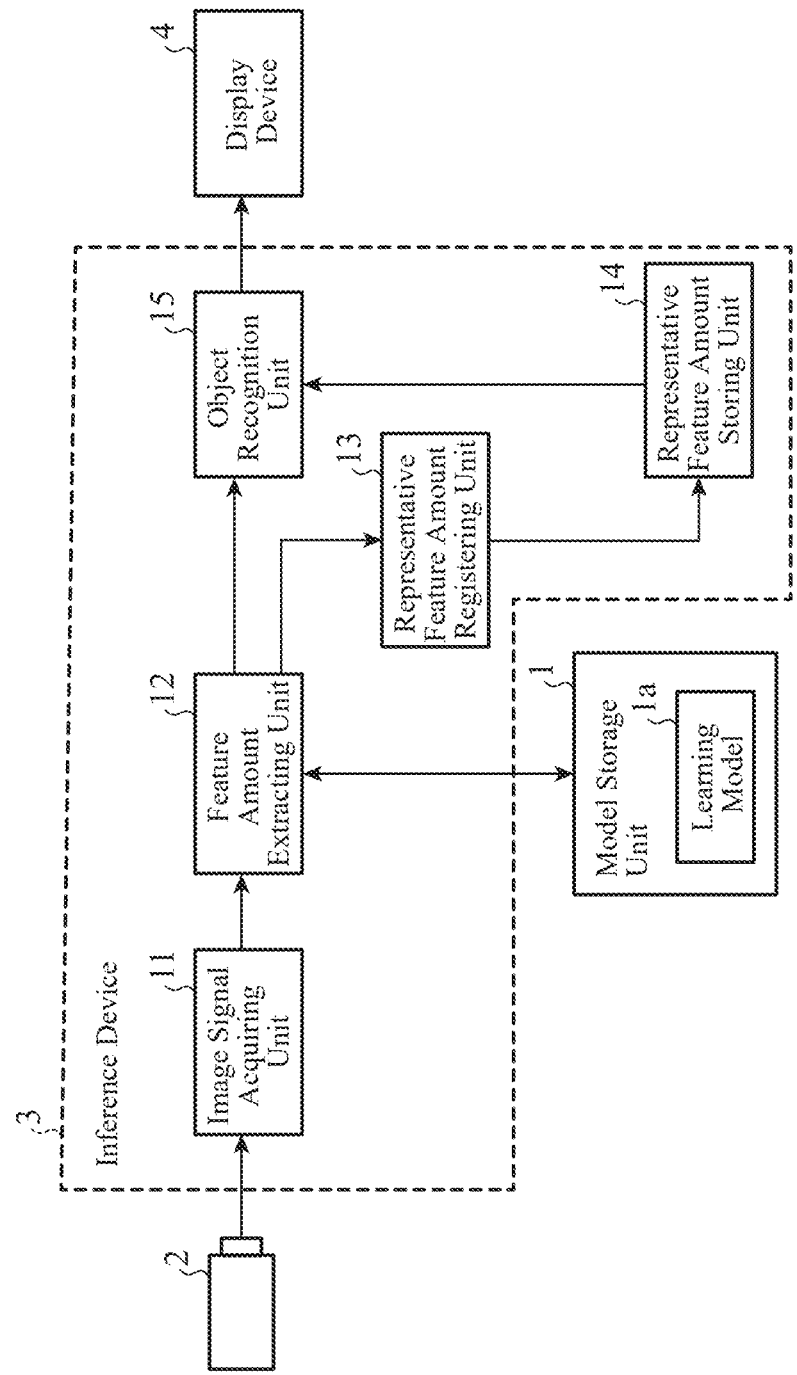
FIG. 1 is a configuration diagram illustrating an inference device 3 according to a first embodiment.

FIG. 1 is a configuration diagram illustrating an inference device 3 according to a first embodiment.

Figure 2:
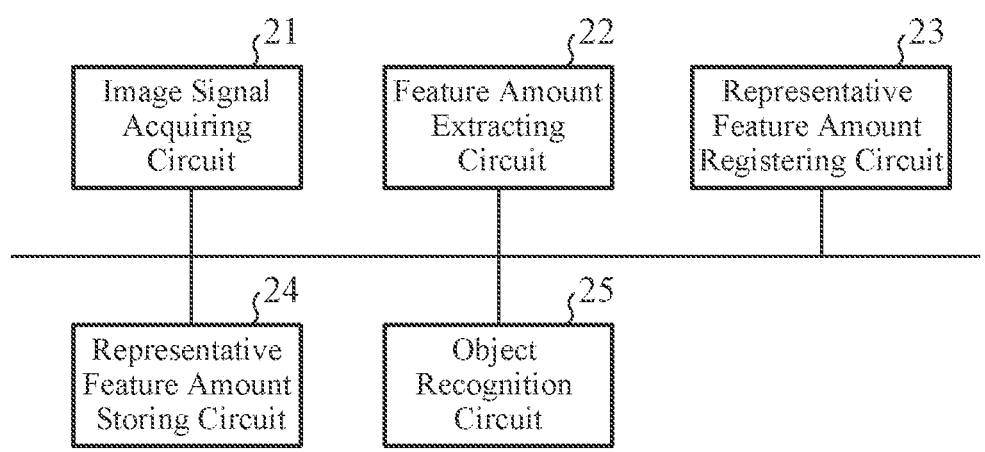
FIG. 2 is a hardware configuration diagram illustrating hardware of the inference device 3 according to the first embodiment.

FIG. 2 is a hardware configuration diagram illustrating hardware of the inference device 3 according to the first embodiment.

In FIG. 1, a model storage unit 1 is implemented by, for example, a hard disk or a random access memory (RAM).

The model storage unit 1 stores a learning model 1a.

The learning model 1a is implemented by, for example, a multilayer neural network (Deep Neural Networks: DNNs). The DNNs include the Convolutional Neural Networks (CNNs).

In the learning model 1a, an image signal indicating a training image is provided as training data at the time of learning, and learning of the training image is completed. The training image is, for example, an image used for an image recognition task.

The type of the image that is a domain of the training image may be any type, and the training image is, for example, any of an RGB image, a TIR image, or an image generated by a CG simulator.

In the inference device 3 illustrated in FIG. 1, for convenience of description, it is assumed that the training image is an RGB image. The learning model 1a receives a large number of RGB images and has learned the RGB images.

In a case where each of a domain and a recognition task of an image is different from that of a training image, when an image signal indicating an image for conversion that is an image in which a detection target object appears is provided from a feature amount extracting unit 12 described later, the learning model 1a outputs, to the feature amount extracting unit 12, a feature vector indicating a feature amount obtained by combining a plurality of feature amounts of the detection target object appearing in the image for conversion after each of the plurality of feature amounts is blurred.

Any image having one or more of a domain and a recognition task which are different from those of the training image can be used as an image for conversion. In the inference device 3 illustrated in FIG. 1, for convenience of description, the description will be given assuming that the image for conversion is a TIR image.

The CNNs implementing the learning model 1a are very deep CNNs. As very deep CNNs, for example, there is the ResNet having 101 layers. Therefore, for example, at the time of object recognition, when an image signal is provided to the input layer of the learning model 1a, the feature amount indicated by the feature vector output from the output layer of the learning model 1a is a high-dimensional feature amount. The high-dimensional feature amount includes feature amounts of a plurality of dimensions, and for example, a Tensor is used as a feature vector indicating the high-dimensional feature amount.

A low-dimensional feature amount output from a shallow layer among a plurality of stages of hidden layers included in the learning model 1a indicates, for example, color, luminance, or direction. Therefore, the low-dimensional feature amount depends on the domain of the image indicated by the image signal provided to the input layer. That is, the feature amount indicated by the feature vector output from the shallow layer of the learning model 1a when the image signal of the RGB image is provided to the input layer of the learning model 1a may be greatly different from the feature amount indicated by the feature vector output from the shallow layer of the learning model 1a when the image signal of the TIR image is provided to the input layer of the learning model 1a.

On the other hand, the high-dimensional feature amount output from a sufficiently deep intermediate layer of the learning model 1a indicates a conceptual feature expressing the detection target object. Therefore, the high-dimensional feature amount is conceptual information having extremely low dependency on the domain of the image indicated by the image signal provided to the input layer. In addition, by adopting a high-dimensional feature of a deeper layer, it is possible to acquire general-purpose information having low dependency on the task. As a feature of a conceptual object, for example, "Objectness" or "Informativeness" is known.

That is, a difference between the high-dimensional feature amount indicated by the feature vector output from the output layer of the learning model 1a when the image signal of the RGB image is provided to the input layer of the learning model 1a and the high-dimensional feature amount indicated by the feature vector output from the output layer of the learning model 1a when the image signal of the TIR image is provided to the input layer of the learning model 1a is small.

Therefore, in a case where the learning model 1a is implemented by CNNs and the inference device 3 uses the high-dimensional feature amount indicated by the feature vector output from a sufficiently deep intermediate layer of CNNs, dependency on the domain and dependency on the recognition task of the image indicated by the image signal provided to the input layer are reduced.

The detection target object corresponds to, for example, a product in which a position where an abnormality has occurred is detected in addition to determination of normality or abnormality. Specifically, examples of the detection target object include a circuit board, a rolled plate, and a plastic molded product.

A camera 2 is implemented by, for example, an infrared camera.

The camera 2 images a detection target object.

When the inference device 3 registers an image of a domain different from that at the time of learning (hereinafter referred to as "at the time of domain conversion"), the camera 2 outputs, for example, an image signal indicating a TIR image in which a detection target object appears to the inference device 3 as an image signal indicating an image for conversion in which a detection target object appears.

When the inference device 3 recognizes the detection target object (hereinafter referred to as "at the time of object recognition"), the camera 2 outputs, for example, an image signal indicating a TIR image in which the detection target object appears to the inference device 3 as an image signal indicating an inference target image in which the detection target object appears.

In FIG. 1, the camera 2 outputs an image signal indicating an image for conversion to the inference device 3. However, this is merely an example, and an image signal indicating the image for conversion in which the detection target object appears may be output to the inference device 3 from a storage unit (not illustrated) that stores the image signal.

The inference device 3 includes an image signal acquiring unit 11, a feature amount extracting unit 12, a representative feature amount registering unit 13, a representative feature amount storing unit 14, and an object recognition unit 15.

In the inference device 3 illustrated in FIG. 1, the model storage unit 1 is provided outside the inference device 3. However, this is merely an example, and for example, the model storage unit 1 may be provided inside the inference device 3, and the learning model 1a may be built in the feature amount extracting unit 12.

The image signal acquiring unit 11 is implemented by, for example, an image signal acquiring circuit 21 illustrated in FIG. 2.

At the time of domain conversion, the image signal acquiring unit 11 acquires, from the camera 2, an image signal indicating an image for conversion in which a detection target object appears.

Then, the image signal acquiring unit 11 outputs an image signal indicating the image for conversion to the feature amount extracting unit 12.

At the time of object recognition, the image signal acquiring unit 11 acquires, from the camera 2, an image signal indicating an inference target image in which a detection target object appears.

Then, the image signal acquiring unit 11 outputs an image signal indicating the inference target image to the feature amount extracting unit 12.

The image for conversion and the inference target image have the same domain of images, and are both TIR images, for example.

The feature amount extracting unit 12 is implemented by, for example, a feature amount extracting circuit 22 illustrated in FIG. 2.

At the time of domain conversion, the feature amount extracting unit 12 provides the image signal acquired by the image signal acquiring unit 11 to the learning model 1a, and acquires, from the learning model 1a, a feature vector indicating a representative feature amount that is obtained by combining a plurality of feature amounts of the detection target object appearing in the image for conversion after each of the plurality of feature amounts is blurred.

The feature amount extracting unit 12 outputs the feature vector to the representative feature amount registering unit 13.

At the time of object recognition, the feature amount extracting unit 12 provides the image signal acquired by the image signal acquiring unit 11 to the learning model 1a, and acquires, from the learning model 1a, a feature vector indicating an inference time feature amount that is obtained by combining a plurality of feature amounts of the detection target object appearing in the inference target image after each of the feature amounts is blurred.

The feature amount extracting unit 12 outputs the feature vector to the object recognition unit 15.

As processing of blurring each of the plurality of feature amounts, "Pooling Operation" is known.

The representative feature amount registering unit 13 is implemented by, for example, a representative feature amount registering circuit 23 illustrated in FIG. 2.

The representative feature amount registering unit 13 registers the representative feature amount acquired by the feature amount extracting unit 12.

That is, the representative feature amount registering unit 13 acquires a feature vector indicating the representative feature amount from the feature amount extracting unit 12, and stores the feature vector in the representative feature amount storing unit 14.

The representative feature amount storing unit 14 is implemented by, for example, a representative feature amount storing circuit 24 illustrated in FIG. 2.

The representative feature amount storing unit 14 stores a feature vector indicating the representative feature amount.

The object recognition unit 15 is implemented by, for example, an object recognition circuit 25 illustrated in FIG. 2.

The object recognition unit 15 acquires the feature vector indicating the inference time feature amount of the detection target object appearing in the inference target image from the feature amount extracting unit 12, and acquires the feature vector indicating the representative feature amount from the representative feature amount storing unit 14.

The object recognition unit 15 recognizes the detection target object appearing in the inference target image on the basis of the representative feature amount and the inference time feature amount.

Specifically, the object recognition unit 15 calculates similarity between the feature vector indicating the representative feature amount and the feature vector indicating the inference time feature amount, and recognizes the detection target object appearing in the inference target image on the basis of the similarity. Furthermore, specifically, the object recognition unit 15 compares the similarity with a threshold. Then, the object recognition unit 15 recognizes, as the recognition of the detection target object, for example, whether the detection target object appearing in the inference target image is normal or abnormal on the basis of the comparison result between the similarity and the threshold. In addition, for example, the object recognition unit 15 classifies the detection target object into a plurality of classes as the recognition of the detection target object.

The object recognition unit 15 generates display data indicating a recognition result of the detection target object, and outputs the display data to a display device 4.

The display device 4 displays the recognition result of the detection target object on a display (not illustrated) according to the display data output from the object recognition unit 15.

In FIG. 1, it is assumed that each of the image signal acquiring unit 11, the feature amount extracting unit 12, the representative feature amount registering unit 13, the representative feature amount storing unit 14, and the object recognition unit 15, which are components of the inference device 3, is implemented by dedicated hardware as illustrated in FIG. 2. That is, it is assumed that the inference device 3 is implemented by the image signal acquiring circuit 21, the feature amount extracting circuit 22, the representative feature amount registering circuit 23, the representative feature amount storing circuit 24, and the object recognition circuit 25.

The representative feature amount storing circuit 24 corresponds to, for example, a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disk, a flexible disk, an optical disk, a compact disk, a mini disk, or a digital versatile disc (DVD).

Each of the image signal acquiring circuit 21, the feature amount extracting circuit 22, the representative feature amount registering circuit 23, and the object recognition circuit 25 corresponds to, for example, a single circuit, a composite circuit, a programmed processor, a parallel-programmed processor, an application specific integrated circuit (ASIC), a field-programmable gate array (FPGA), or a combination thereof.

The components of the inference device 3 are not limited to those implemented by dedicated hardware, and the inference device 3 may be implemented by software, firmware, or a combination of software and firmware.

The software or firmware is stored in a memory of a computer as a program. The computer means hardware that executes a program, and corresponds to, for example, a central processing unit (CPU), a graphical processing unit (GPU), a central processor, a processing unit, an arithmetic unit, a microprocessor, a microcomputer, a processor, or a digital signal processor (DSP).

Figure 3:
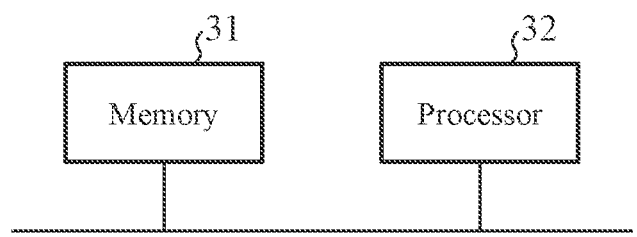

FIG. 3 is a hardware configuration diagram of a computer in a case where the inference device 3 is implemented by software, firmware, or the like.

In a case where the inference device 3 is implemented by software, firmware, or the like, the representative feature amount storing unit 14 is configured on a memory 31 of the computer. A program for causing the computer to execute each processing procedure performed in the image signal acquiring unit 11, the feature amount extracting unit 12, the representative feature amount registering unit 13, and the object recognition unit 15 is stored in the memory 31. Then, a processor 32 of the computer executes the program stored in the memory 31.

In addition, FIG. 2 illustrates an example in which each of the components of the inference device 3 is implemented by dedicated hardware, and FIG. 3 illustrates an example in which the inference device 3 is implemented by software, firmware, or the like. However, this is merely an example, and some components in the inference device 3 may be implemented by dedicated hardware, and the remaining components may be implemented by software, firmware, or the like.

Figure 4:
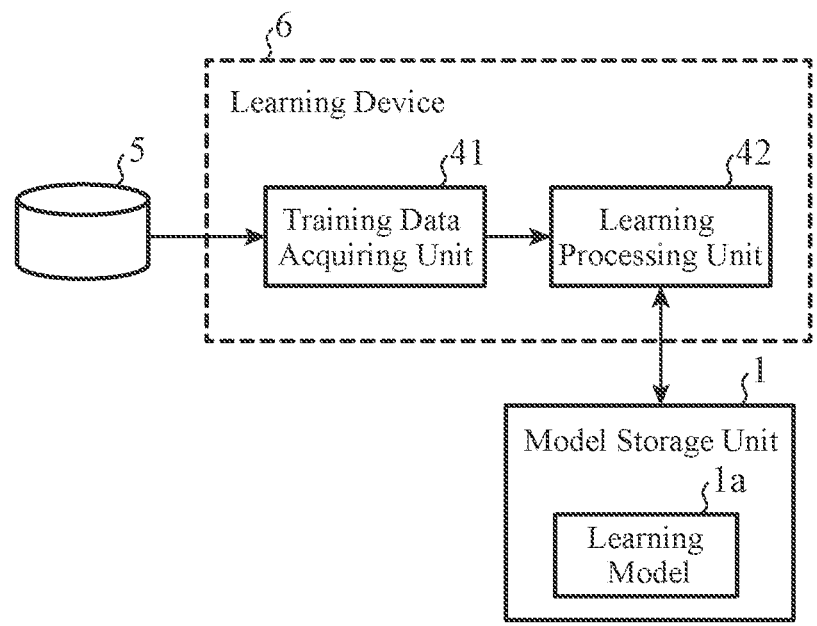
FIG. 4 is a configuration diagram illustrating a learning device 6.

FIG. 4 is a configuration diagram illustrating a learning device 6.

Figure 5:
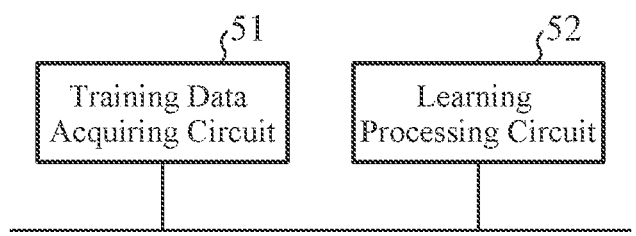
FIG. 5 is a hardware configuration diagram illustrating hardware of the learning device 6.

FIG. 5 is a hardware configuration diagram illustrating hardware of the learning device 6.

A training data storing unit 5 is implemented by, for example, a hard disk or a RAM.

The training data storing unit 5 stores an image signal indicating a training image as training data.

The learning device 6 includes a training data acquiring unit 41 and a learning processing unit 42.

The training data acquiring unit 41 is implemented by, for example, a training data acquiring circuit 51 illustrated in FIG. 5.

The training data acquiring unit 41 acquires training data from the training data storing unit 5.

The training data acquiring unit 41 outputs the training data to the learning processing unit 42.

The learning processing unit 42 is implemented by, for example, a learning processing circuit 52 illustrated in FIG. 5.

The learning processing unit 42 acquires a large amount of training data from the training data acquiring unit 41.

The learning processing unit 42 provides each piece of training data to the learning model 1*a* and causes the learning model 1*a* to learn a training image indicated by an image signal included in each piece of the training data.

When an image signal is provided at the time of domain conversion or object recognition, the learned learning model 1*a* outputs a feature vector corresponding to the image signal.

In FIG. 4, it is assumed that each of the training data acquiring unit 41 and the learning processing unit 42, which are components of the learning device 6, is implemented by dedicated hardware as illustrated in FIG. 5. That is, it is assumed that the learning device 6 is implemented by the training data acquiring circuit 51 and the learning processing circuit 52.

Each of the training data acquiring unit 41 and the learning processing unit 42 corresponds to, for example, a single circuit, a composite circuit, a programmed processor, a parallel programmed processor, ASIC, FPGA, or a combination thereof.

The components of the learning device 6 are not limited to those implemented by dedicated hardware, and the learning device 6 may be implemented by software, firmware, or a combination of software and firmware.

Figure 6:
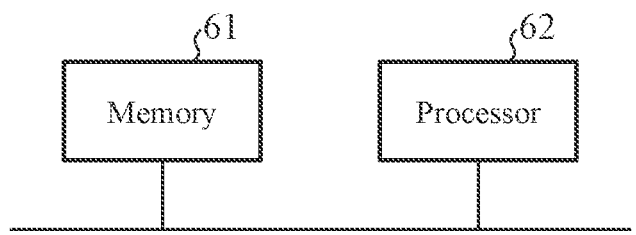

FIG. 6 is a hardware configuration diagram of a computer in a case where the learning device 6 is implemented by software, firmware, or the like.

In a case where the learning device 6 is implemented by software, firmware, or the like, a program for causing a computer to execute each processing procedure performed in the training data acquiring unit 41 and the learning processing unit 42 is stored in a memory 61. Then, a processor 62 of the computer executes the program stored in the memory 61.

Furthermore, FIG. 5 illustrates an example in which each of the components of the learning device 6 is implemented by dedicated hardware, and FIG. 6 illustrates an example in which the learning device 6 is implemented by software, firmware, or the like. However, this is merely an example, and some components in the learning device 6 may be implemented by dedicated hardware, and the remaining components may be implemented by software, firmware, or the like.

First, the operation of the learning device 6 illustrated in FIG. 4 will be described.

A large amount of training data is stored in the training data storing unit 5, and each piece of training data includes an image signal indicating a training image.

The training data acquiring unit 41 of the learning device 6 acquires a large amount of training data from the training data storing unit 5.

The training data acquiring unit 41 outputs each piece of training data to the learning processing unit 42.

The learning processing unit 42 acquires each piece of training data from the training data acquiring unit 41.

The learning processing unit 42 provides each piece of training data to the learning model 1*a* and causes the learning model 1*a* to learn a training image indicated by an image signal included in each piece of training data.

For example, when an image signal indicating an RGB image is provided to the input layer, the learned learning model 1*a* outputs, from the output layer, a feature vector indicating a high-dimensional feature amount of a detection target object appearing in the RGB image as a feature vector corresponding to the image signal.

In a case where the training image used for learning in the learning model 1*a* is, for example, an RGB image and a TIR image is not used as the training image, even if both the detection target object appearing in the RGB image and the detection target object appearing in the TIR image are normal and the same object, a feature vector output from the output layer when an image signal indicating the RGB image is provided to the input layer may be different from a feature vector output from the output layer when an image signal indicating the TIR image is provided to the input layer.

However, CNNs that implement the learning model 1a are very deep CNNs, and a feature vector output from a sufficiently deep intermediate layer of the learning model 1a indicates a high-dimensional feature amount. Therefore, the above difference is slight.

In addition, as described above, the feature amount indicated by the feature vector output from the sufficiently deep intermediate layer of the learning model 1a is obtained by combining feature amounts of a plurality of layers of the sufficiently deep intermediate layer of the detection target object after each of the feature amounts of the plurality of layers is blurred. Therefore, the feature amount indicated by the feature vector indicates a robust feature in which each of the dependency of the domain of the image and the dependency of the recognition task is excluded.

Next, the operation of the inference device 3 at the time of domain conversion will be described.

Figure 7:
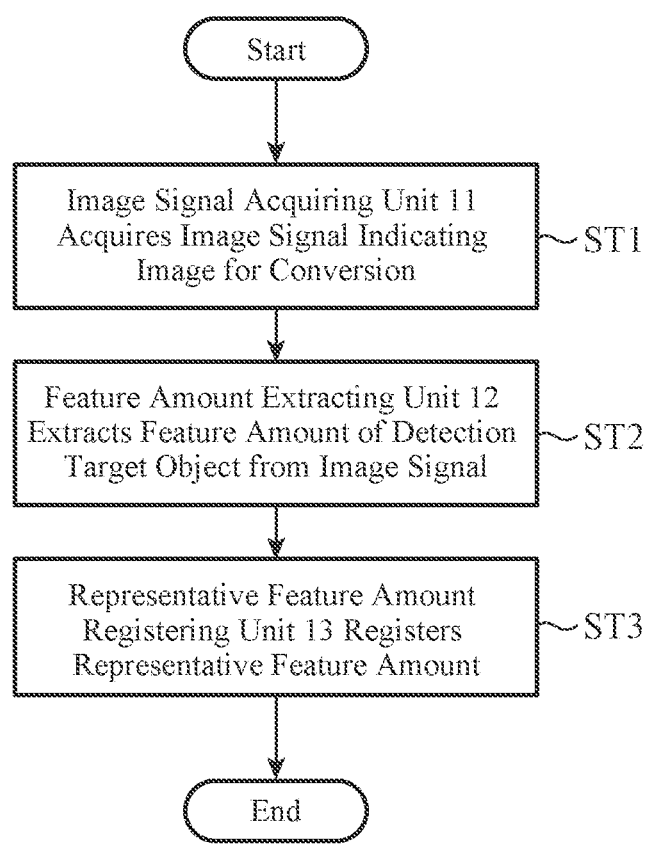
FIG. 7 is a flowchart illustrating a processing procedure performed in the inference device 3 at the time of domain conversion.

FIG. 7 is a flowchart illustrating a processing procedure performed in the inference device 3 at the time of domain conversion.

The camera 2 images a detection target object. The detection target object imaged by the camera 2 is a normal detection target object.

The detection target object imaged by the camera 2 may be an abnormal detection target object. However, for example, in an industrial manufacturing line, since a probability that an abnormality occurs in a detection target object is generally extremely small, it may be difficult to image an abnormal detection target object. Therefore, it is assumed here that the detection target object imaged by the camera 2 is a normal detection target object.

The camera 2 outputs, for example, an image signal indicating a TIR image in which a detection target object appears to the inference device 3 as an image signal indicating an image for conversion in which the detection target object appears.

The image signal acquiring unit 11 acquires, from the camera 2, an image signal indicating the image for conversion in which the detection target object appears (step ST1 in FIG. 7).

The image signal acquiring unit 11 outputs an image signal indicating the image for conversion to the feature amount extracting unit 12.

The feature amount extracting unit 12 acquires an image signal indicating the image for conversion from the image signal acquiring unit 11.

The feature amount extracting unit 12 extracts the feature amount of the detection target object appearing in the image for conversion from the image signal (step ST2 in FIG. 7).

Specifically, the feature amount extracting unit 12 provides the image signal to the learning model 1a, and acquires, from the learning model 1a, a feature vector indicating a representative feature amount that is obtained by combining a plurality of feature amounts of the detection target object appearing in the image for conversion after each of the plurality of feature amounts is blurred (step ST2 in FIG. 7).

The feature amount extracting unit 12 outputs the feature vector to the representative feature amount registering unit 13.

The representative feature amount registering unit 13 acquires a feature vector from the feature amount extracting unit 12.

The representative feature amount registering unit 13 registers the representative feature amount indicated by the feature vector (step ST3 in FIG. 7).

Specifically, the representative feature amount registering unit 13 registers the representative feature amount by causing the representative feature amount storing unit 14 to store the feature vector.

Here, the feature vector indicating the representative feature amount is expressed by a Tensor. The Tensor can express higher-dimensional information than a Vector, and may be referred to as a feature map.

Since the Tensor can express high-dimensional information, in a case where the representative feature amount registering unit 13 causes the representative feature amount storing unit 14 to store the feature vector expressed by the Tensor as it is, it may take a lot of processing time when the object recognition unit 15 to be described later performs matching of the feature vectors.

In order to shorten the processing time required when the object recognition unit 15 performs matching of the feature vectors, the representative feature amount registering unit 13 may convert the feature vector indicating the representative feature amount into a One-hot-vector having a smaller number of dimensions than the Tensor, and cause the representative feature amount storing unit 14 to store the One-hot-vector.

Regardless of whether the feature vector registered by the representative feature amount registering unit 13 is a Tensor or a One-hot-vector, high-dimensional information such as several hundred dimensions is expressed. Therefore, even if there are some variations among the plurality of normal detection target objects, in the feature vector, the representative feature of the normal detection target object is described in a high dimension.

Next, the operation of the inference device 3 at the time of object recognition will be described.

Figure 8:
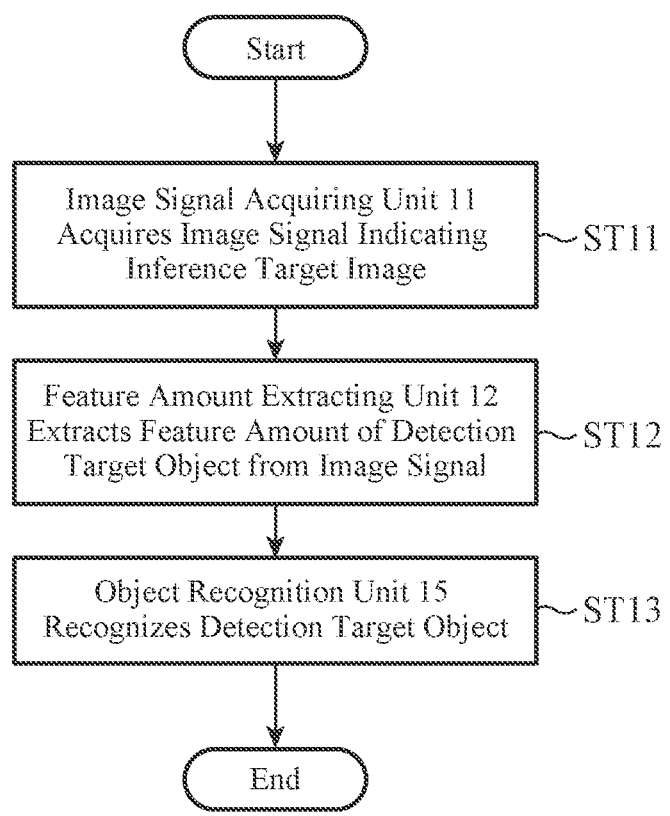
FIG. 8 is a flowchart illustrating an inference method that is a processing procedure performed in the inference device 3 at the time of object recognition.

FIG. 8 is a flowchart illustrating an inference method that is a processing procedure performed in the inference device 3 at the time of object recognition.

The camera 2 images a detection target object. It is unknown whether the detection target object imaged by the camera 2 is a normal object or an abnormal object.

The camera 2 outputs an image signal indicating a TIR image in which a detection target object appears to the inference device 3 as an image signal indicating an inference target image in which a detection target object appears.

The image signal acquiring unit 11 acquires, from the camera 2, an image signal indicating an inference target image in which a detection target object appears (step ST11 in FIG. 8).

The image signal acquiring unit 11 outputs an image signal indicating the inference target image to the feature amount extracting unit 12.

The feature amount extracting unit 12 acquires an image signal indicating the inference target image from the image signal acquiring unit 11.

The feature amount extracting unit 12 extracts the feature amount of the detection target object appearing in the inference target image from the image signal (step ST12 in FIG. 8).

Specifically, the feature amount extracting unit 12 provides an image signal to the learning model 1a, and acquires, from the learning model 1a, a feature vector indicating an inference time feature amount that is obtained by combining a plurality of feature amounts of the detection target object appearing in the inference target image after each of the plurality of feature amounts is blurred.

The feature amount extracting unit 12 outputs the feature vector to the object recognition unit 15.

The object recognition unit 15 acquires the feature vector from the feature amount extracting unit 12 and acquires the feature vector indicating the representative feature amount from the representative feature amount storing unit 14.

The object recognition unit 15 recognizes the detection target object appearing in the inference target image on the basis of the representative feature amount and the inference time feature amount indicated by the feature vector output from the feature amount extracting unit 12 (step ST13 in FIG. 8).

Specifically, the object recognition unit 15 calculates similarity between the feature vector indicating the representative feature amount and the feature vector indicating the inference time feature amount. It is possible to calculate the similarity between the feature vector indicating the representative feature amount and the feature vector indicating the inference time feature amount, for example, by calculating an inner product of the feature vector indicating the representative feature amount and the feature vector indicating the inference time feature amount.

The object recognition unit 15 compares the similarity with the threshold, and recognizes whether the detection target object appearing in the inference target image is normal or abnormal on the basis of the comparison result between the similarity and the threshold.

That is, the object recognition unit 15 determines that the detection target object is normal when the similarity is greater than or equal to the threshold, and determines that the detection target object is abnormal when the similarity is less than the threshold.

The threshold may be stored in an internal memory of the object recognition unit 15 or may be given from the outside of the inference device 3.

In the inference device illustrated in FIG. 1, an example in which the object recognition unit 15 recognizes whether the detection target object is normal or abnormal assuming that the detection target object is binary classified is illustrated. However, this is merely an example, and the object recognition unit 15 may recognize the detection target object in order to classify the detection target object into a plurality of classes. An example in which the detection target object is classified into a plurality of classes will be described in second to fourth embodiments.

In a case where the training image is, for example, an RGB image and each of the image for conversion and the inference target image is, for example, a TIR image, the domain of the training image is different from the domain of each of the image for conversion and the inference target image, but the domain of the image for conversion is the same as the domain of the inference target image.

Therefore, if the detection target object appearing in the inference target image is a normal object, the representative feature amount acquired by the feature amount extracting unit 12 at the time of domain conversion and the inference time feature amount acquired by the feature amount extracting unit 12 at the time of object recognition have substantially the same value.

On the other hand, if the detection target object appearing in the inference target image is an abnormal object, the representative feature amount acquired by the feature amount extracting unit 12 at the time of domain conversion and the inference time feature amount acquired by the feature amount extracting unit 12 at the time of object recognition have greatly different values.

Therefore, the object recognition unit 15 can recognize the detection target object with high accuracy by comparing the similarity with the threshold.

The object recognition unit 15 generates display data indicating a recognition result of the detection target object.

The object recognition unit 15 outputs the display data to the display device 4. The display device 4 displays the recognition result of the detection target object on a display (not illustrated) according to the display data output from the object recognition unit 15.

As a result, an inspector or the like can check whether the detection target object is normal or abnormal by looking at the display.

In the first embodiment described above, the inference device 3 is configured to include: the image signal acquiring unit 11 to acquire an image signal indicating an inference target image that is an image in which a detection target object appears in a case where one or more of a condition that a domain of the inference target image is different from a domain of a training image and a condition that a recognition task of the inference target image is different from a pre-learned task are satisfied; and the feature amount extracting unit 12 to provide the image signal acquired by the image signal acquiring unit 11 to a learning model 1a in which learning of the training image has been completed, and acquire, from the learning model 1a, an inference time feature amount that is obtained by combining a plurality of feature amounts of the detection target object appearing in the inference target image after each of the plurality of feature amounts is blurred. The inference device 3 further includes the object recognition unit 15 to recognize the detection target object appearing in the inference target image on the basis of a representative feature amount that is a registered feature amount of the detection target object appearing in an image for conversion in which each of a domain and a recognition task of the image is the same target as that of the inference target image, and the inference time feature amount acquired by the feature amount extracting unit 12. Therefore, the inference device 3 can suppress the deterioration of the inference accuracy even in a case where one or more of the task and the domain are different.

Furthermore, in the first embodiment, the inference device 3 is configured such that the image signal acquiring unit 11 acquires an image signal indicating the image for conversion, and the feature amount extracting unit 12 provides the image signal indicating the image for conversion to the learning model 1a, and acquires, from the learning model 1a, a representative feature amount that is obtained by combining a plurality of feature amounts of the detection target object appearing in the image for conversion after each of the plurality of feature amounts is blurred. In addition, the inference device 3 includes the representative feature amount registering unit 13 to register the representative feature amount acquired by the feature amount extracting unit 12. Therefore, the inference device 3 can register the representative feature amount that can be used for the recognition processing of the detection target object.

In the inference device 3 illustrated in FIG. 1, the feature amount extracting unit 12 provides an image signal to the learning model 1a implemented by very deep CNNs, and acquires, from the learning model 1a, a feature amount obtained by combining a plurality of feature amounts of the detection target object after each of the plurality of feature amounts is blurred.

In a case where the learning model 1a is implemented by very deep CNNs, as described above, even if a domain or a detection target object of the inference target image indicated by the image signal provided to the input layer of the learning model 1a is different from that of the training image, the difference in the feature vector output from the output layer is slight.

On the other hand, in a case where the learning model 1a is implemented by a general neural network or the like, if the domain of the inference target image indicated by the image signal provided to the input layer of the learning model 1a or the detection target object appearing in the inference target image is different from that of the training image, the difference in the feature vector output from the output layer may be large.

However, the domain of the image for conversion and the domain of the inference target image are the same. Therefore, even in a case where the learning model 1a is implemented by a general neural network or the like, if the detection target object appearing in the inference target image is a normal object, the representative feature amount acquired by the feature amount extracting unit 12 at the time of domain conversion and the inference time feature amount acquired by the feature amount extracting unit 12 at the time of object recognition have substantially the same value.

On the other hand, if the detection target object appearing in the inference target image is an abnormal object, the representative feature amount acquired by the feature amount extracting unit 12 at the time of domain conversion and the inference time feature amount acquired by the feature amount extracting unit 12 at the time of object recognition have greatly different values.

Therefore, even in a case where the learning model 1a is implemented by a general neural network or the like, the object recognition unit 15 can recognize the detection target object with high accuracy.

Second Embodiment

In a second embodiment, an inference device 3 including an object recognition unit 17 to recognize a type of a detection target object will be described.

Figure 9:
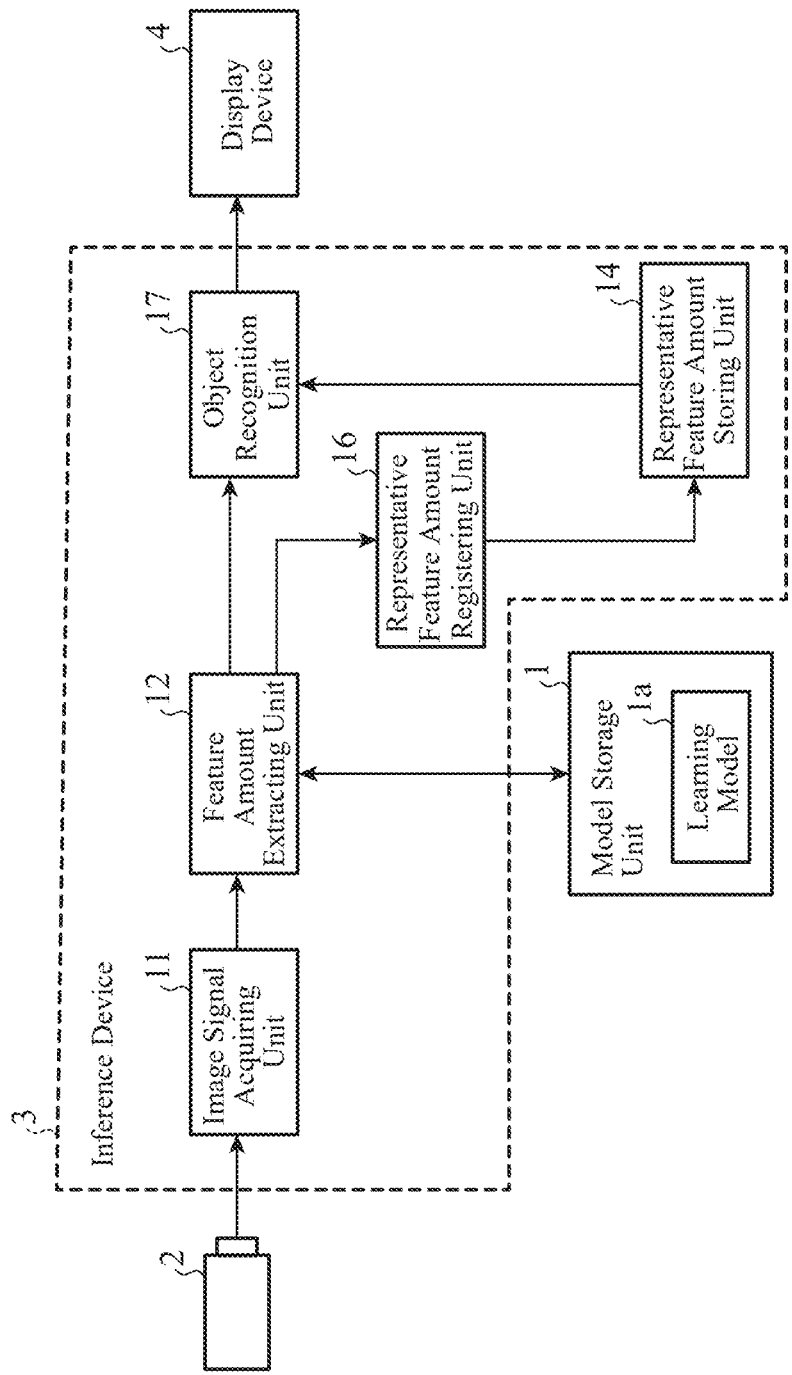
FIG. 9 is a configuration diagram illustrating an inference device 3 according to a second embodiment.

FIG. 9 is a configuration diagram illustrating the inference device 3 according to the second embodiment. In FIG. 9, the same reference symbols as those in FIG. 1 denote the same or corresponding parts, and thus description thereof is omitted.

Figure 10:
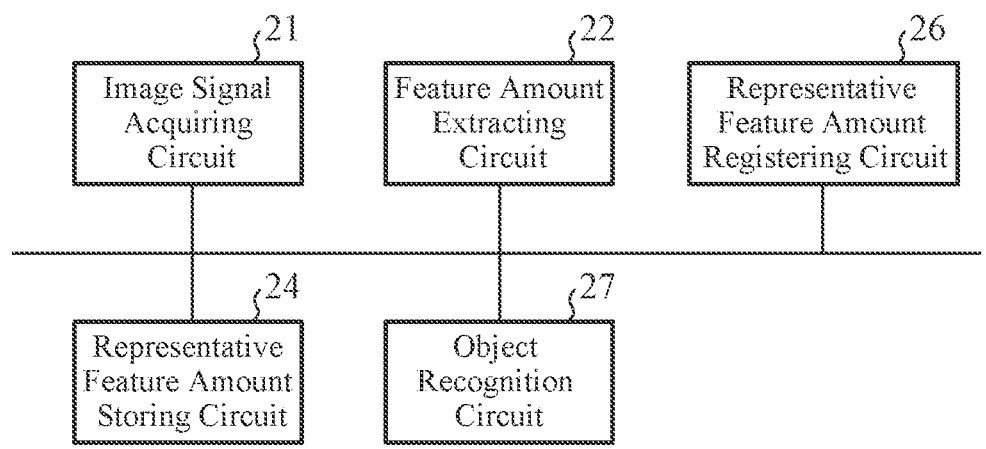
FIG. 10 is a hardware configuration diagram illustrating hardware of the inference device 3 according to the second embodiment.

FIG. 10 is a hardware configuration diagram illustrating hardware of the inference device 3 according to the second embodiment. In FIG. 10, the same reference symbols as those in FIG. 2 denote the same or corresponding parts, and thus description thereof is omitted.

The inference device 3 illustrated in FIG. 9 includes an image signal acquiring unit 11, a feature amount extracting unit 12, a representative feature amount registering unit 16, a representative feature amount storing unit 14, and an object recognition unit 17.

In the inference device 3 illustrated in FIG. 9, the model storage unit 1 is provided outside the inference device 3. However, this is merely an example, and for example, the model storage unit 1 may be provided inside the inference device 3, and the learning model 1a may be built in the feature amount extracting unit 12.

In the inference device 3 illustrated in FIG. 9, an example in which whether a detection target object is a passenger car, a truck, or a bus is recognized as the type of the detection target object recognized by the object recognition unit 17 will be described. In this case, the detection target object is any one of a passenger car, a truck, and a bus. The task in this case is a task of image classification.

However, this is merely an example, and whether the detection target object is a passenger car whose vehicle type name is ∞, a passenger car whose vehicle type name is ΔΔ, or a passenger car whose vehicle type name is □□ may be recognized as the type of the detection target object recognized by the object recognition unit 17. In this case, the detection target object is any one of a passenger car whose vehicle type name is ∞, a passenger car whose vehicle type name is ΔΔ, and a passenger car whose vehicle type name is □□. The task in this case is called "Fine-grained Image Classification".

For example, even in a case where it is made possible to recognize whether the detection target object is a passenger car, a truck, or a bus, training data including an image signal indicating a training image is provided to the learning model 1a.

The representative feature amount registering unit 16 is implemented by, for example, a representative feature amount registering circuit 26 illustrated in FIG. 10.

The representative feature amount registering unit 16 registers the representative feature amount acquired by the feature amount extracting unit 12.

That is, the representative feature amount registering unit 16 acquires a feature vector indicating a representative feature amount that is obtained by combining a plurality of feature amounts of a passenger car that is the detection target object appearing in the image for conversion after each of the plurality of feature amounts is blurred, and causes the representative feature amount storing unit 14 to store the feature vector.

In addition, the representative feature amount registering unit 16 acquires a feature vector indicating a representative feature amount that is obtained by combining a plurality of feature amounts of a truck that is the detection target object appearing in the image for conversion after each of the plurality of feature amounts is blurred, and causes the representative feature amount storing unit 14 to store the feature vector.

In addition, the representative feature amount registering unit 16 acquires a feature vector indicating a representative feature amount that is obtained by combining a plurality of feature amounts of a bus that is the detection target object appearing in the image for conversion after each of the plurality of feature amounts is blurred, and causes the representative feature amount storing unit 14 to store the feature vector.

The object recognition unit 17 is implemented by, for example, an object recognition circuit 27 illustrated in FIG. 10.

The object recognition unit 17 acquires, from the feature amount extracting unit 12, a feature vector indicating an inference time feature amount that is obtained by combining a plurality of feature amounts of the detection target object appearing in the inference target image after each of the plurality of feature amounts is blurred, and acquires, from the representative feature amount storing unit 14, a feature vector indicating a representative feature amount.

The object recognition unit 17 recognizes the detection target object appearing in the inference target image on the basis of the representative feature amount and the inference time feature amount.

Specifically, the object recognition unit 17 compares the representative feature amounts of the plurality of detection target objects having different types with the inference time feature amount extracted by the feature amount extracting unit 12, and specifies the representative feature amount corresponding to the feature amount extracted by the feature amount extracting unit 12 among the representative feature amounts of the plurality of detection target objects.

The object recognition unit 17 recognizes the type of the detection target object appearing in the inference target image on the basis of the specification result of the representative feature amount.

The object recognition unit 17 generates display data indicating a recognition result of the detection target object, and outputs the display data to the display device 4.

In FIG. 9, it is assumed that each of the image signal acquiring unit 11, the feature amount extracting unit 12, the representative feature amount registering unit 16, the representative feature amount storing unit 14, and the object recognition unit 17, which are components of the inference device 3, is implemented by dedicated hardware as illustrated in FIG. 10. That is, it is assumed that the inference device 3 is implemented by the image signal acquiring circuit 21, the feature amount extracting circuit 22, the representative feature amount registering circuit 26, the representative feature amount storing circuit 24, and the object recognition circuit 27.

Each of the image signal acquiring circuit 21, the feature amount extracting circuit 22, the representative feature amount registering circuit 26, and the object recognition circuit 27 corresponds to, for example, a single circuit, a composite circuit, a programmed processor, a parallel-programmed processor, ASIC, FPGA, or a combination thereof.

The components of the inference device 3 are not limited to those implemented by dedicated hardware, and the inference device 3 may be implemented by software, firmware, or a combination of software and firmware.

In a case where the inference device 3 is implemented by software, firmware, or the like, the representative feature amount storing unit 14 is configured on the memory 31 illustrated in FIG. 3. A program for causing a computer to execute each processing procedure performed in the image signal acquiring unit 11, the feature amount extracting unit 12, the representative feature amount registering unit 16, and the object recognition unit 17 is stored in the memory 31 illustrated in FIG. 3. Then, the processor 32 illustrated in FIG. 3 executes the program stored in the memory 31.

In addition, FIG. 10 illustrates an example in which each of the components of the inference device 3 is implemented by dedicated hardware, and FIG. 3 illustrates an example in which the inference device 3 is implemented by software, firmware, or the like. However, this is merely an example, and some components in the inference device 3 may be implemented by dedicated hardware, and the remaining components may be implemented by software, firmware, or the like.

Next, the operation of the inference device 3 at the time of domain conversion will be described.

The camera 2 images a detection target object. The detection target object imaged by the camera 2 is one of a passenger car, a truck, and a bus. However, the inference device 3 can also classify the detection target object into, for example, 1000 types. Therefore, classifying the detection target object into three of a passenger car, a truck, and a bus is merely an example.

The camera 2 outputs, for example, an image signal indicating a TIR image in which a passenger car appears to the inference device 3 as an image signal indicating an image for conversion in which the passenger car that is a detection target object appears.

The camera 2 outputs, for example, an image signal indicating a TIR image in which a track is shown to the inference device 3 as an image signal indicating an image for conversion in which a truck that is a detection target object appears.

In addition, the camera 2 outputs, for example, an image signal indicating a TIR image in which a bus that is a detection target object appears to the inference device 3 as an image signal indicating an image for conversion in which the bus appears.

The image for conversion is not necessarily limited to the TIR image, but in the case of the RGB image, it is difficult to recognize the image at night, so that the recognition accuracy of the detection target object may be deteriorated. Therefore, the TIR image is used as the image for conversion.

The image signal acquiring unit 11 acquires an image signal indicating the image for conversion in which a passenger car appears from the camera 2, and outputs the image signal indicating the image for conversion to the feature amount extracting unit 12.

The image signal acquiring unit 11 acquires an image signal indicating the image for conversion in which a truck appears from the camera 2, and outputs the image signal indicating the image for conversion to the feature amount extracting unit 12.

In addition, the image signal acquiring unit 11 acquires an image signal indicating the image for conversion in which a bus appears from the camera 2, and outputs the image signal indicating the image for conversion to the feature amount extracting unit 12.

The feature amount extracting unit 12 acquires, from the image signal acquiring unit 11, an image signal indicating the image for conversion in which the passenger car appears.

The feature amount extracting unit 12 extracts the feature amount of the passenger car appearing in the image for conversion from the image signal.

Specifically, the feature amount extracting unit 12 provides the image signal to the learning model 1a, and acquires, from the learning model 1a, a feature vector Fv1 indicating a representative feature amount obtained by combining a plurality of feature amounts of the passenger car appearing in the image for conversion after each of the plurality of feature amounts is blurred.

The feature amount extracting unit 12 outputs the feature vector Fv1 to the representative feature amount registering unit 16.

The feature amount extracting unit 12 acquires, from the image signal acquiring unit 11, an image signal indicating the image for conversion in which the truck appears.

The feature amount extracting unit 12 extracts the feature amount of the truck appearing in the image for conversion from the image signal.

Specifically, the feature amount extracting unit 12 provides the image signal to the learning model 1a, and acquires, from the learning model 1a, a feature vector Fv2 indicating a representative feature amount obtained by combining a plurality of feature amounts of the truck appearing in the image for conversion after each of the plurality of feature amounts is blurred.

The feature amount extracting unit 12 outputs the feature vector Fv2 to the representative feature amount registering unit 16.

In addition, the feature amount extracting unit 12 acquires an image signal indicating the image for conversion in which the bus appears from the image signal acquiring unit 11.

The feature amount extracting unit 12 extracts the feature amount of the bus appearing in the image for conversion from the image signal.

Specifically, the feature amount extracting unit 12 provides the image signal to the learning model 1*a*, and acquires, from the learning model 1*a*, a feature vector Fv3 indicating a representative feature amount obtained by combining a plurality of feature amounts of the bus appearing in the image for conversion after each of the plurality of feature amounts is blurred.

The feature amount extracting unit 12 outputs the feature vector Fv3 to the representative feature amount registering unit 16.

The representative feature amount registering unit 16 acquires the feature vector Fv1 from the feature amount extracting unit 12.

The representative feature amount registering unit 16 registers the representative feature amount by causing the representative feature amount storing unit 14 to store the feature vector Fv1.

In addition, the representative feature amount registering unit 16 acquires the feature vector Fv2 from the feature amount extracting unit 12.

The representative feature amount registering unit 16 registers the representative feature amount by causing the representative feature amount storing unit 14 to store the feature vector Fv2.

In addition, the representative feature amount registering unit 16 acquires the feature vector Fv3 from the feature amount extracting unit 12.

The representative feature amount registering unit 16 registers the representative feature amount by causing the representative feature amount storing unit 14 to store the feature vector Fv3.

Next, the operation of the inference device 3 at the time of object recognition will be described.

The camera 2 images a detection target object. It is unknown whether the detection target object imaged by the camera 2 is a passenger car, a truck, or a bus.

The camera 2 outputs, for example, an image signal indicating a TIR image in which a detection target object appears to the inference device 3 as an image signal indicating an inference target image in which the detection target object appears.

In this example, the inference target image is a TIR image. However, the inference target image is not limited to the TIR image as long as the domain is the same as that of the image for conversion.

The image signal acquiring unit 11 acquires, from the camera 2, an image signal indicating an inference target image in which a detection target object appears.

The image signal acquiring unit 11 outputs an image signal indicating the inference target image to the feature amount extracting unit 12.

The feature amount extracting unit 12 acquires an image signal indicating the inference target image from the image signal acquiring unit 11.

The feature amount extracting unit 12 extracts the feature amount of the detection target object appearing in the inference target image from the image signal.

Specifically, the feature amount extracting unit 12 provides an image signal to the learning model 1*a*, and acquires, from the learning model 1*a*, a feature vector Fv indicating an inference time feature amount obtained by combining a plurality of feature amounts of the detection target object appearing in the inference target image after each of the plurality of feature amounts is blurred.

The feature amount extracting unit 12 outputs the feature vector Fv to the object recognition unit 17.

The object recognition unit 17 acquires the feature vector Fv from the feature amount extracting unit 12.

In addition, the object recognition unit 17 acquires, from the representative feature amount storing unit 14, each of the feature vector Fv1 indicating the representative feature amount of a passenger car, the feature vector Fv2 indicating the representative feature amount of a truck, and the feature vector Fv3 indicating the representative feature amount of a bus.

The object recognition unit 17 calculates similarity Mr1, Mr2, Mr3 between each of the feature vectors Fv1, Fv2, and Fv3 and the feature vector Fv.

The object recognition unit 17 specifies the highest similarity among the similarities Mr1, Mr2, and Mr3, and specifies the representative feature amount corresponding to the highest similarity.

For example, when the highest similarity is Mr1, the representative feature amount corresponding to the highest similarity is the representative feature amount of the passenger car. For example, when the highest similarity is Mr2, the representative feature amount corresponding to the highest similarity is the representative feature amount of the truck. In addition, when the highest similarity is Mr3, the representative feature amount corresponding to the highest similarity is the representative feature amount of the bus.

When the representative feature amount having the highest similarity is the representative feature amount of the passenger car, the object recognition unit 17 recognizes that the type of the detection target object appearing in the inference target image is the passenger car.

When the representative feature amount having the highest similarity is the representative feature amount of the truck, the object recognition unit 17 recognizes that the type of the detection target object appearing in the inference target image is the truck.

When the representative feature amount having the highest similarity is the representative feature amount of the bus, the object recognition unit 17 recognizes that the type of the detection target object appearing in the inference target image is the bus.

The object recognition unit 17 generates display data indicating a recognition result of the detection target object, and outputs the display data to the display device 4.

The display device 4 displays the recognition result of the detection target object on a display (not illustrated) according to the display data output from the object recognition unit 17.

Thus, an inspector or the like can check the type of the detection target object by looking at the display.

In the second embodiment described above, the inference device 3 is configured such that the object recognition unit 17 compares the representative feature amounts of a plurality of detection target objects having different types from each other with the inference time feature amount extracted by the feature amount extracting unit 12, performs specification of a representative feature amount corresponding to the inference time feature amount extracted by the feature amount extracting unit 12 among the representative feature amounts of the plurality of detection target objects, and recognizes a type of the detection target object appearing in the inference target image on the basis of the result of the specification of the representative feature amount. Therefore, even in a case where one or more of the task and the domain are different, the inference device 3 can suppress the degradation of the inference accuracy regarding the recognition of the type of the detection target object.

Third Embodiment

In a third embodiment, an inference device 3 including an object recognition unit 19 to recognize a region where a detection target object is present will be described. This is a task called object detection.

Figure 11:
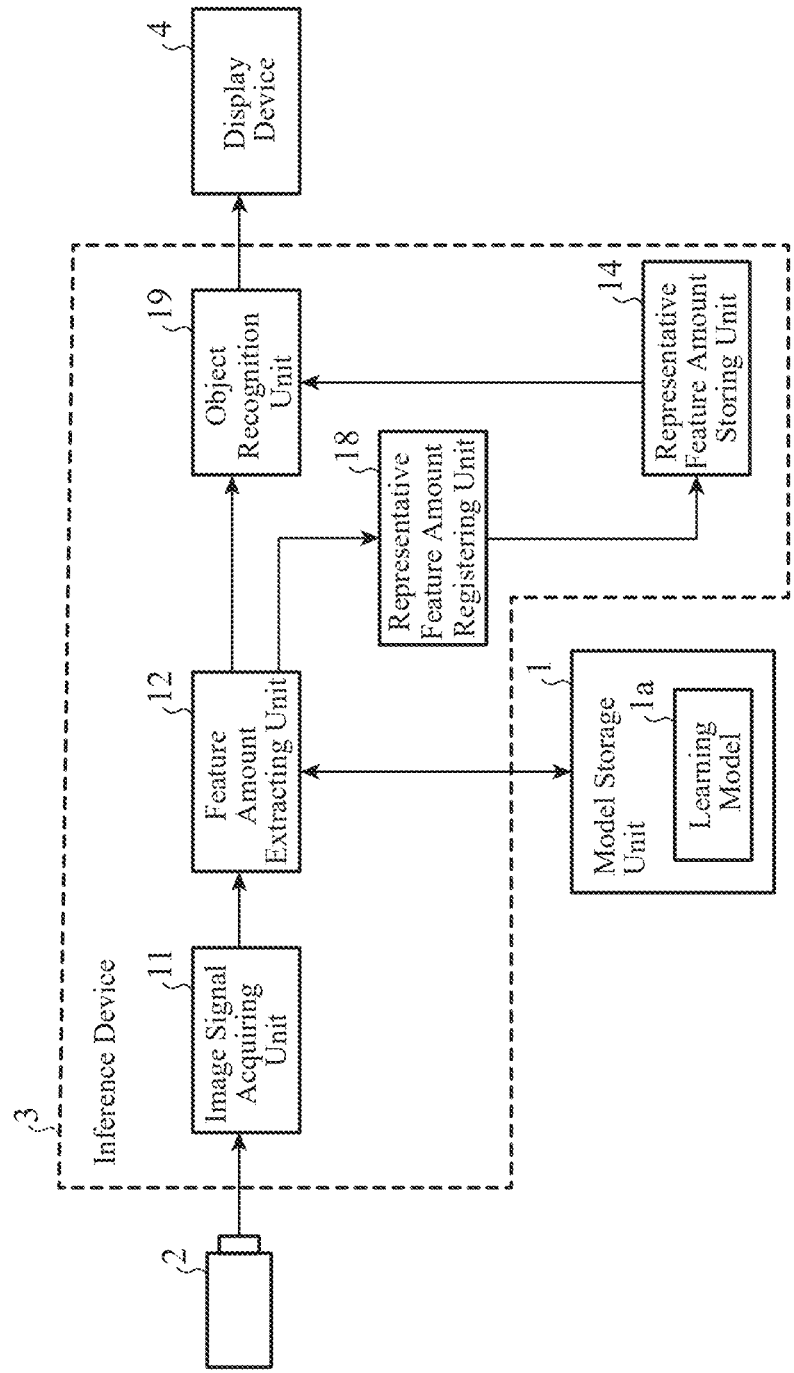
FIG. 11 is a configuration diagram illustrating an inference device 3 according to a third embodiment.

FIG. 11 is a configuration diagram illustrating the inference device 3 according to the third embodiment. In FIG. 11, the same reference symbols as those in FIG. 1 denote the same or corresponding parts, and thus description thereof is omitted.

Figure 12:
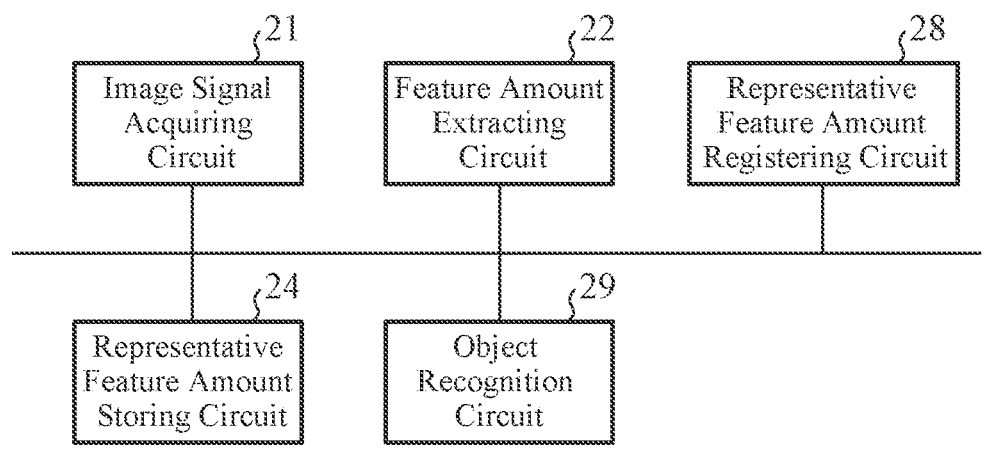
FIG. 12 is a hardware configuration diagram illustrating hardware of the inference device 3 according to the third embodiment.

FIG. 12 is a hardware configuration diagram illustrating hardware of the inference device 3 according to the third embodiment. In FIG. 12, the same reference symbols as those in FIG. 2 denote the same or corresponding parts, and thus description thereof is omitted.

The inference device 3 illustrated in FIG. 11 includes an image signal acquiring unit 11, a feature amount extracting unit 12, a representative feature amount registering unit 18, a representative feature amount storing unit 14, and an object recognition unit 19.

In the inference device 3 illustrated in FIG. 11, the model storage unit 1 is provided outside the inference device 3. However, this is merely an example, and for example, the model storage unit 1 may be provided inside the inference device 3, and the learning model 1a may be built in the feature amount extracting unit 12.

In the inference device 3 illustrated in FIG. 11, an example in which the region where the detection target object recognized by the object recognition unit 19 is present is estimated as a spatial position where the detection target object is present simultaneously with recognition of a plurality of classes such as a passenger car, a bus, and a truck will be described.

The representative feature amount registering unit 18 is implemented by, for example, a representative feature amount registering circuit 28 illustrated in FIG. 12.

The representative feature amount registering unit 18 registers the representative feature amount acquired by the feature amount extracting unit 12.

That is, the representative feature amount registering unit 18 acquires a feature vector indicating a representative feature amount obtained by combining a plurality of feature amounts of the detection target object appearing in the image for conversion after each of the plurality of feature amounts is blurred, and causes the representative feature amount storing unit 14 to store the feature vector including the presence range (Objectness) of the object in the high-dimensional feature. As to the presence range (Objectness) of the detection target object to be stored, the high-dimensional feature may be registered as the Tensor as it is, or only the presence range (Objectness) of the detection target object may be extracted, dimensionally compressed, and registered.

The object recognition unit 19 is implemented by, for example, an object recognition circuit 29 illustrated in FIG. 12.

The object recognition unit 19 acquires, from the feature amount extracting unit 12, a feature vector indicating an inference time feature amount obtained by combining a plurality of feature amounts of the detection target object appearing in the inference target image after each of the plurality of feature amounts is blurred, and acquires, from the representative feature amount storing unit 14, a feature vector indicating a representative feature amount.

The object recognition unit 19 recognizes the detection target object appearing in the inference target image on the basis of the representative feature amount and the inference time feature amount.

Specifically, the object recognition unit 19 acquires the representative feature amount including the presence range (Objectness) of the detection target object from the representative feature amount storing unit 14 in which the feature vector including the presence range (Objectness) of the object in the high-dimensional feature is registered, compares the representative feature amount with the inference time feature amount extracted from the feature amount extracting unit 12, and specifies the representative feature amount corresponding to the inference time feature amount extracted by the feature amount extracting unit 12 among the representative feature amounts of the plurality of detection target objects. The class having the most similar representative feature amount is the class to which the detection target object belongs. Furthermore, since the inference time feature amount includes the presence range (Objectness) of the detection target object included in the image input at the time of inference, it is possible to represent the spatial presence position of the object by converting the description method of the high-dimensional feature of the inference time feature amount from a Tensor or the like into a two-dimensional space.

The object recognition unit 19 generates display data indicating a recognition result of the detection target object, and outputs the display data to the display device 4. Here, in a case where the display data is expressed as a rectangle on a two-dimensional space, an object detection (Object Detection) task is performed, and in a case where it is expressed as a region on a two-dimensional space, a segmentation (Sematic Segmentation) task is performed.

In FIG. 11, it is assumed that each of the image signal acquiring unit 11, the feature amount extracting unit 12, the representative feature amount registering unit 18, the representative feature amount storing unit 14, and the object recognition unit 19, which are components of the inference device 3, is implemented by dedicated hardware as illustrated in FIG. 12. That is, it is assumed that the inference device 3 is implemented by the image signal acquiring circuit 21, the feature amount extracting circuit 22, the representative feature amount registering circuit 28, the representative feature amount storing circuit 24, and the object recognition circuit 29.

Each of the image signal acquiring circuit 21, the feature amount extracting circuit 22, the representative feature amount registering circuit 28, and the object recognition circuit 29 corresponds to, for example, a single circuit, a composite circuit, a programmed processor, a parallel-programmed processor, ASIC, FPGA, or a combination thereof.

The components of the inference device 3 are not limited to those implemented by dedicated hardware, and the inference device 3 may be implemented by software, firmware, or a combination of software and firmware.

In a case where the inference device 3 is implemented by software, firmware, or the like, the representative feature amount storing unit 14 is configured on the memory 31 illustrated in FIG. 3. A program for causing a computer to execute each processing procedure performed in the image signal acquiring unit 11, the feature amount extracting unit 12, the representative feature amount registering unit 18, and the object recognition unit 19 is stored in the memory 31 illustrated in FIG. 3. Then, the processor 32 illustrated in FIG. 3 executes the program stored in the memory 31.

In addition, FIG. 12 illustrates an example in which each of the components of the inference device 3 is implemented by dedicated hardware, and FIG. 3 illustrates an example in which the inference device 3 is implemented by software, firmware, or the like. However, this is merely an example, and some components in the inference device 3 may be implemented by dedicated hardware, and the remaining components may be implemented by software, firmware, or the like.

Next, the operation of the inference device 3 at the time of domain conversion will be described.

The camera 2 images a detection target object.

The camera 2 outputs an image signal indicating a TIR image in which a detection target object appears to the inference device 3 as an image signal indicating an image for conversion in which the detection target object appears.

The image signal acquiring unit 11 acquires, from the camera 2, an image signal indicating an image for conversion in which a detection target object appears.

The image signal acquiring unit 11 outputs, to the feature amount extracting unit 12, an image signal indicating each image for conversion for the class of the target to be recognized.

The feature amount extracting unit 12 acquires an image signal indicating each image for conversion from the image signal acquiring unit 11.

The feature amount extracting unit 12 extracts the feature amount of the detection target object appearing in each image for conversion from each image signal.

Specifically, the feature amount extracting unit 12 provides the image signal to the learning model 1a, and acquires, from the learning model 1a, a feature vector indicating a representative feature amount obtained by combining a plurality of feature amounts of the detection target object after each of the plurality of feature amounts is blurred.

The feature amount extracting unit 12 outputs the feature vector to the representative feature amount registering unit 18.

The representative feature amount registering unit 18 acquires a feature vector from the feature amount extracting unit 12.

The representative feature amount registering unit 18 registers the representative feature amount by causing the representative feature amount storing unit 14 to store the feature vector.

Next, the operation of the inference device 3 at the time of object recognition will be described.

The camera 2 images a detection target object. The position of the detection target object imaged by the camera 2 is unknown.

The camera 2 outputs an image signal indicating a TIR image in which a detection target object appears to the inference device 3 as an image signal indicating an inference target image in which a detection target object appears.

The image signal acquiring unit 11 acquires, from the camera 2, an image signal indicating an inference target image in which a detection target object appears.

The image signal acquiring unit 11 outputs an image signal indicating the inference target image to the feature amount extracting unit 12.

The feature amount extracting unit 12 acquires an image signal indicating the inference target image from the image signal acquiring unit 11.

The feature amount extracting unit 12 extracts the feature amount of the detection target object appearing in the inference target image from the image signal.

Specifically, the feature amount extracting unit 12 provides an image signal to the learning model 1a, and acquires, from the learning model 1a, a feature vector indicating an inference time feature amount obtained by combining a plurality of feature amounts of the detection target object appearing in the inference target image after each of the plurality of feature amounts is blurred.

The feature amount extracting unit 12 outputs the feature vector to the object recognition unit 19.

The object recognition unit 19 acquires the feature vector from the feature amount extracting unit 12.

In addition, the object recognition unit 19 acquires a plurality of feature vectors indicating representative feature amounts from the representative feature amount storing unit 14.

The object recognition unit 19 calculates each of the similarities between the feature vectors indicating the plurality of representative feature amounts and the feature vector acquired from the feature amount extracting unit 12.

The object recognition unit 19 specifies the highest similarity among the similarities between the representative feature amounts registered as many as the number of targets to be recognized and the inference time feature amount, and specifies a representative feature amount corresponding to the highest similarity. The object recognition unit 19 can determine which class the target belongs to by specifying the representative feature amount.

In the object recognition unit 19, the class having the most similar representative feature amount is a class to which the detection target object belongs. For example, in a case where both the representative feature amount and the inference time feature amount use the TIR image as an input, class classification beyond the domain at the time of learning becomes possible.

Furthermore, since the inference time feature amount includes the presence range (Objectness) of the detection target object included in the image input at the time of inference, it is possible to represent the spatial presence position of the object by converting the description method of the high-dimensional feature of the inference time feature amount from the Tensor or the like into the two-dimensional space. As a result, in a case where the task at the time of learning is image classification, recognition beyond the task becomes possible.

The object recognition unit 19 generates display data indicating a recognition result of the detection target object, and outputs the display data to the display device 4.

The display device 4 displays the recognition result of the detection target object on a display (not illustrated) according to the display data output from the object recognition unit 19.

As a result, an inspector or the like can check the region where the detection target object is present by looking at the display.

In the third embodiment described above, the inference device 3 is configured such that the object recognition unit 19 compares the representative feature amounts of a plurality of detection target objects having different presence regions from each other with the inference time feature amount acquired by the feature amount extracting unit 12, perform specification of a representative feature amount corresponding to the inference time feature amount acquired by the feature amount extracting unit 12 among the representative feature amounts of the plurality of detection target objects, and recognizes a region where the detection target object is present as recognition of the detection target object appearing in the inference target image on the basis of a result of the specification of the representative feature amount. Therefore, even in a case where one or more of the task and the domain are different, the inference device 3 can suppress the degradation of the inference accuracy regarding the recognition of the region where the detection target object is present.

Fourth Embodiment

In a fourth embodiment, an inference device 3 including an object recognition unit 72 to recognize each of a type and a presence region of a detection target object will be described.

Figure 13:
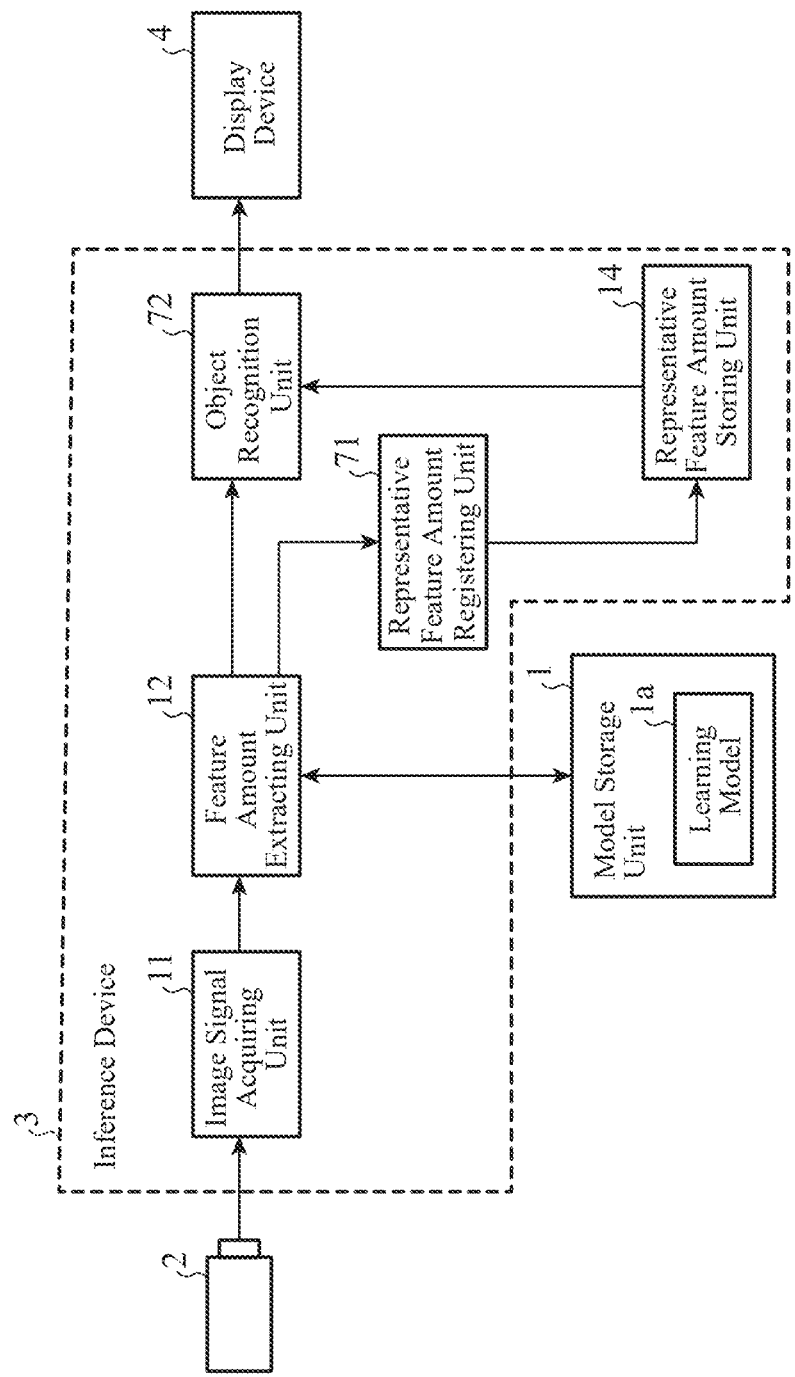
FIG. 13 is a configuration diagram illustrating an inference device 3 according to a fourth embodiment.

FIG. 13 is a configuration diagram illustrating the inference device 3 according to the fourth embodiment. In FIG. 13, the same reference symbols as those in FIG. 1 denote the same or corresponding parts, and thus description thereof is omitted.

Figure 14:
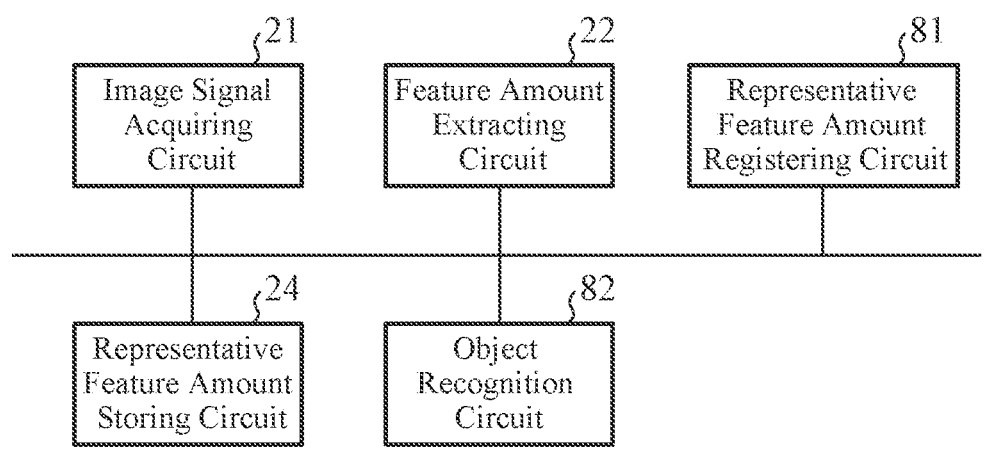
FIG. 14 is a hardware configuration diagram illustrating hardware of the inference device 3 according to the fourth embodiment.

FIG. 14 is a hardware configuration diagram illustrating hardware of the inference device 3 according to the fourth embodiment. In FIG. 14, the same reference symbols as those in FIG. 2 denote the same or corresponding parts, and thus description thereof is omitted.

The inference device 3 illustrated in FIG. 13 includes an image signal acquiring unit 11, a feature amount extracting unit 12, a representative feature amount registering unit 71, a representative feature amount storing unit 14, and an object recognition unit 72.

In the inference device 3 illustrated in FIG. 13, the model storage unit 1 is provided outside the inference device 3. However, this is merely an example, and for example, the model storage unit 1 may be provided inside the inference device 3, and the learning model 1a may be built in the feature amount extracting unit 12.

In the inference device 3 illustrated in FIG. 13, the region where the detection target object recognized by the object recognition unit 72 is present is the region of the class where the detection target object is present among a plurality of classes.

Furthermore, in the inference device 3 illustrated in FIG. 13, an example in which whether the detection target object is a passenger car, a truck, or a bus is recognized as the type of the detection target object recognized by the object recognition unit 72 will be described. In this case, the detection target object is any one of a passenger car, a truck, and a bus.

Even in a case where each of the type and the presence region of the detection target object can be recognized, training data including an image signal indicating a training image is provided to the learning model 1a.

The representative feature amount registering unit 71 is implemented by, for example, a representative feature amount registering circuit 81 illustrated in FIG. 14.

The representative feature amount registering unit 71 registers the representative feature amount acquired by the feature amount extracting unit 12.

That is, the representative feature amount registering unit 71 acquires a feature vector indicating a representative feature amount obtained by combining a plurality of feature amounts of the passenger car which is present in a certain region after each of the plurality of feature amounts is blurred, and causes the representative feature amount storing unit 14 to store the feature vector.

In addition, the representative feature amount registering unit 71 acquires a feature vector indicating a representative feature amount obtained by combining a plurality of feature amounts of the truck which is present in a certain region after each of the plurality of feature amounts is blurred, and causes the representative feature amount storing unit 14 to store the feature vector.

In addition, the representative feature amount registering unit 71 acquires a feature vector indicating a representative feature amount obtained by combining a plurality of feature amounts of the bus which is present in a certain region after each of the plurality of feature amounts is blurred, and causes the representative feature amount storing unit 14 to store the feature vector.

The object recognition unit 72 is implemented by, for example, an object recognition circuit 82 illustrated in FIG. 14.

The object recognition unit 72 acquires, from the feature amount extracting unit 12, a feature vector indicating an inference time feature amount obtained by combining a plurality of feature amounts of the detection target object appearing in the inference target image after each of the plurality of feature amounts is blurred, and acquires, from the representative feature amount storing unit 14, a feature vector indicating a representative feature amount.

The object recognition unit 72 recognizes each of the type and the presence region of the detection target object appearing in the inference target image on the basis of the representative feature amount and the inference time feature amount.

Specifically, the object recognition unit 72 acquires the representative feature amount including both the presence range (Objectness) of the detection target object and the type of the object from the representative feature amount storing unit 14 in which the feature vector including both the presence range (Objectness) of the object and the type of the object in the high-dimensional feature is registered, compares the representative feature amount with the inference time feature amount extracted from the feature amount extracting unit 12, and specifies the representative feature amount corresponding to the inference time feature amount extracted by the feature amount extracting unit 12 among the plurality of representative feature amounts of the detection target object. The class having the most similar representative feature amount is a class to which the detection target object belongs. Furthermore, since the inference time feature amount includes the presence range (Objectness) of the detection target object included in the image input at the time of inference, it is possible to represent the spatial presence position of the object by converting the description method of the high-dimensional feature of the inference time feature amount from a Tensor or the like into a two-dimensional space.

The object recognition unit 72 generates display data indicating a recognition result of the detection target object, and outputs the display data to the display device 4. Here, in a case where the display data is expressed as a rectangle on a two-dimensional space, an object detection (Object Detection) task is performed, and in a case where it is expressed as a region on a two-dimensional space, a segmentation (Sematic Segmentation) task is performed.

In FIG. 13, it is assumed that each of the image signal acquiring unit 11, the feature amount extracting unit 12, the representative feature amount registering unit 71, the representative feature amount storing unit 14, and the object recognition unit 72, which are components of the inference device 3, is implemented by dedicated hardware as illustrated in FIG. 14. That is, it is assumed that the inference device 3 is implemented by the image signal acquiring circuit 21, the feature amount extracting circuit 22, the representative feature amount registering circuit 81, the representative feature amount storing circuit 24, and the object recognition circuit 82.

Each of the image signal acquiring circuit 21, the feature amount extracting circuit 22, the representative feature amount registering circuit 81, and the object recognition circuit 82 corresponds to, for example, a single circuit, a composite circuit, a programmed processor, a parallel-programmed processor, ASIC, FPGA, or a combination thereof.

The components of the inference device 3 are not limited to those implemented by dedicated hardware, and the inference device 3 may be implemented by software, firmware, or a combination of software and firmware.

In a case where the inference device 3 is implemented by software, firmware, or the like, the representative feature amount storing unit 14 is configured on the memory 31 illustrated in FIG. 3. A program for causing a computer to execute each processing procedure performed in the image signal acquiring unit 11, the feature amount extracting unit 12, the representative feature amount registering unit 71, and the object recognition unit 72 is stored in the memory 31 illustrated in FIG. 3. Then, the processor 32 illustrated in FIG. 3 executes the program stored in the memory 31.

In addition, FIG. 14 illustrates an example in which each of the components of the inference device 3 is implemented by dedicated hardware, and FIG. 3 illustrates an example in which the inference device 3 is implemented by software, firmware, or the like. However, this is merely an example, and some components in the inference device 3 may be implemented by dedicated hardware, and the remaining components may be implemented by software, firmware, or the like.

Next, the operation of the inference device 3 at the time of domain conversion will be described.

The camera 2 images a detection target object. The detection target object imaged by the camera 2 is any one of a passenger car, a truck, and a bus. However, the inference device 3 can also classify the detection target object into, for example, 1000 types. Therefore, classifying the detection target object into three of a passenger car, a truck, and a bus is merely an example.

The detection target object imaged by the camera 2 is present in a certain region.

The camera 2 outputs, for example, an image signal indicating a TIR image in which a detection target object appears to the inference device 3 as an image signal indicating an image for conversion in which the detection target object is present in a certain region appears.

The image signal acquiring unit 11 acquires, from the camera 2, an image signal indicating an image for conversion in which a detection target object is present in a certain region appears, and outputs the image signal indicating the image for conversion to the feature amount extracting unit 12.

That is, the image signal acquiring unit 11 acquires, from the camera 2, an image signal indicating an image for conversion in which a passenger car is present in a certain region appears, and outputs the image signal indicating the image for conversion to the feature amount extracting unit 12.

The image signal acquiring unit 11 acquires, from the camera 2, an image signal indicating an image for conversion in which a truck is present in a certain region appears, and outputs the image signal indicating the image for conversion to the feature amount extracting unit 12.

In addition, the image signal acquiring unit 11 acquires, from the camera 2, an image signal indicating an image for conversion in which a bus is present in a certain region appears, and outputs the image signal indicating the image for conversion to the feature amount extracting unit 12.

The feature amount extracting unit 12 acquires, from the image signal acquiring unit 11, an image signal indicating an image for conversion in which a passenger car is present in a certain region appears.

The feature amount extracting unit 12 extracts the feature amount of the passenger car appearing in each image for conversion from each image signal.

Specifically, the feature amount extracting unit 12 provides the image signal to the learning model 1*a*, and acquires, from the learning model 1*a*, a feature vector indicating a representative feature amount obtained by combining a plurality of feature amounts of the passenger car which is present in a certain region after each of the plurality of feature amounts is blurred.

The feature amount extracting unit 12 outputs the feature vector to the representative feature amount registering unit 71.

In addition, the feature amount extracting unit 12 acquires, from the image signal acquiring unit 11, an image signal indicating an image for conversion in which a track is present in a certain region appears.

The feature amount extracting unit 12 extracts a feature amount of a track appearing in each image for conversion from each image signal.

Specifically, the feature amount extracting unit 12 provides the image signal to the learning model 1*a*, and acquires, from the learning model 1*a*, a feature vector indicating a representative feature amount obtained by combining a plurality of feature amounts of the truck which is present in a certain region after each of the plurality of feature amounts is blurred.

The feature amount extracting unit 12 outputs the feature vector to the representative feature amount registering unit 71.

In addition, the feature amount extracting unit 12 acquires, from the image signal acquiring unit 11, an image signal indicating an image for conversion in which a bus is present in a certain region appears.

The feature amount extracting unit 12 extracts the feature amount of the bus appearing in each image for conversion from each image signal.

Specifically, the feature amount extracting unit 12 provides the image signal to the learning model 1*a*, and acquires, from the learning model 1*a*, a feature vector indicating a representative feature amount obtained by combining a plurality of feature amounts of the bus which is present in a certain region after each of the plurality of feature amounts is blurred.

The feature amount extracting unit 12 outputs the feature vector to the representative feature amount registering unit 71.

The representative feature amount registering unit 71 acquires each feature vector from the feature amount extracting unit 12.

The representative feature amount registering unit 71 registers the representative feature amount by causing the representative feature amount storing unit 14 to store each feature vector.

Next, the operation of the inference device 3 at the time of object recognition will be described.

The camera 2 images a detection target object. It is unknown whether the detection target object imaged by the camera 2 is a passenger car, a truck, or a bus. In addition, the region where the detection target object imaged by the camera 2 is present is unknown.

The camera 2 outputs an image signal indicating a TIR image in which a detection target object appears to the inference device 3 as an image signal indicating an inference target image in which a detection target object appears.

The image signal acquiring unit 11 acquires, from the camera 2, an image signal indicating an inference target image in which a detection target object appears.

The image signal acquiring unit 11 outputs an image signal indicating the inference target image to the feature amount extracting unit 12.

The feature amount extracting unit 12 acquires an image signal indicating the inference target image from the image signal acquiring unit 11.

The feature amount extracting unit 12 extracts the feature amount of the detection target object appearing in the inference target image from the image signal.

Specifically, the feature amount extracting unit 12 provides an image signal to the learning model 1a, and acquires, from the learning model 1a, a feature vector indicating an inference time feature amount obtained by combining a plurality of feature amounts of the detection target object appearing in the inference target image after each of the plurality of feature amounts is blurred.

The feature amount extracting unit 12 outputs the feature vector to the object recognition unit 72.

The object recognition unit 72 acquires a feature vector from the feature amount extracting unit 12.

In addition, the object recognition unit 72 acquires a plurality of feature vectors indicating representative feature amounts from the representative feature amount storing unit 14.

The object recognition unit 72 calculates similarities between the feature vectors indicating the plurality of representative feature amounts and the feature vector acquired from the feature amount extracting unit 12.

The object recognition unit 72 specifies the highest similarity among the similarities between the representative feature amounts registered as many as the number of targets to be recognized and the inference time feature amount, and specifies the representative feature amount corresponding to the highest similarity. The object recognition unit 19 can determine which class the target belongs to by specifying the representative feature amount.

In the object recognition unit 72, the class having the most similar representative feature amount is the class to which the detection target object belongs. For example, in a case where both the representative feature amount and the inference time feature amount use the TIR image as an input, class classification beyond the domain at the time of learning becomes possible.

Furthermore, since the inference time feature amount includes the presence range (Objectness) of the detection target object included in the image input at the time of inference, it is possible to represent the spatial presence position of the object by converting the description method of the high-dimensional feature of the inference time feature amount from the Tensor or the like into the two-dimensional space. As a result, in a case where the task at the time of learning is image classification, recognition beyond the task becomes possible.

When the representative feature amount having the highest similarity is, for example, the representative feature amount of the passenger car, the object recognition unit 72 recognizes that the type of the detection target object appearing in the inference target image is the passenger car, and recognizes the region where the detection target object is present.

When the representative feature amount having the highest similarity is, for example, the representative feature amount of the truck, the object recognition unit 72 recognizes that the type of the detection target object appearing in the inference target image is the truck, and recognizes the region where the detection target object is present.

When the representative feature amount having the highest similarity is, for example, the representative feature amount of the bus, the object recognition unit 72 recognizes that the type of the detection target object appearing in the inference target image is the bus, and recognizes the region where the detection target object is present.

The object recognition unit 72 generates display data indicating a recognition result of the detection target object, and outputs the display data to the display device 4.

The display device 4 displays the recognition result of the detection target object on a display (not illustrated) according to the display data output from the object recognition unit 72.

As a result, an inspector or the like can check each of the type and the presence region of the detection target object by looking at the display.

In the fourth embodiment described above, the inference device 3 is configured such that the object recognition unit 72 compares the representative feature amounts of the plurality of detection target objects having different types and presence regions from each other with the inference time feature amount acquired by the feature amount extracting unit 12, performs specification of the representative feature amount corresponding to the inference time feature amount acquired by the feature amount extracting unit 12 among the representative feature amounts of the plurality of detection target objects, and recognizes each of the type and the presence region of the detection target object as the recognition of the detection target object appearing in the inference target image on the basis of the result of the specification of the representative feature amount. Therefore, even in a case where one or more of the task and the domain are different, the inference device 3 can suppress the deterioration of the inference accuracy for recognition of each of the type and the presence region of the detection target object.

Note that, in the present disclosure, it is possible to freely combine each embodiment, to modify arbitrary components of each embodiment, or to omit arbitrary components in each embodiment.

INDUSTRIAL APPLICABILITY

The present disclosure is suitable for an inference device, an inference method, and an inference program.

REFERENCE SIGNS LIST

1: model storage unit, 1a: learning model, 2: camera, 3: inference device, 4: display device, 5: training data storing unit, 6: learning device, 11: image signal acquiring unit, 12: feature amount extracting unit, 13: representative feature amount registering unit, 14: representative feature amount storing unit, 15: object recognition unit, 16, 18: representative feature amount registering unit, 17, 19: object recognition unit, 21:

image signal acquiring circuit, 22: feature amount extracting circuit, 23: representative feature amount registering circuit, 24: representative feature amount storing circuit, 25: object recognition circuit, 26, 28: representative feature amount registering circuit, 27, 29: object recognition circuit, 31: memory, 32: processor, 41: training data acquiring unit, 42: learning processing unit, 51: training data acquiring circuit, 52: learning processing circuit, 61: memory, 62: processor, 71: representative feature amount registering unit, 72: object recognition unit, 81: representative feature amount registering circuit, 82: object recognition circuit

The invention claimed is:

1. An inference device comprising: processing circuitry an image signal acquiring unit to acquire an image signal indicating an inference target image that is an image in which a detection target object appears in a case where one or more of a condition that a domain of the inference target image is different from a domain of a training image and a condition that a recognition task of the inference target image is different from a pre-learned task are satisfied,
to provide the image signal to a learning model in which learning of the training image has been completed, and acquire, from the learning model, an inference time feature amount that is obtained by combining a plurality of feature amounts of the detection target object appearing in the inference target image after each of the plurality of feature amounts is blurred, and
to recognize the detection target object appearing in the inference target image on a basis of a representative feature amount that is a registered feature amount of the detection target object appearing in an image for conversion in which each of a domain and a recognition task of the image is the same as that of the inference target image, and the inference time feature amount.

2. The inference device according to claim 1, wherein the processing circuitry acquires an image signal indicating the image for conversion,
provides the image signal indicating the image for conversion to the learning model, and acquires, from the learning model, a representative feature amount that is obtained by combining a plurality of feature amounts of the detection target object appearing in the image for conversion after each of the plurality of feature amounts is blurred, and
registers a representative feature amount.

3. The inference device according to claim 1, wherein the processing circuitry calculates similarity between a feature vector indicating the representative feature amount and a feature vector indicating an inference time feature amount, and recognizes a detection target object appearing in the inference target image on a basis of the similarity.

4. The inference device according to claim 1, wherein the processing circuitry compares representative feature amounts of a plurality of detection target objects having different types from each other with the inference time feature amount, performs specification of a representative feature amount corresponding to the inference time feature amount among the representative feature amounts of the plurality of detection target objects, and recognizes a type of the detection target object as recognition of the detection target object appearing in the inference target image on a basis of a result of the specification.

5. The inference device according to claim 1, wherein the processing circuitry compares representative feature amounts of a plurality of detection target objects having different presence regions from each other with the inference time feature amount, performs specification of a representative feature amount corresponding to the inference time feature amount among the representative feature amounts of the plurality of detection target objects, and recognizes a region where the detection target object is present as recognition of the detection target object appearing in the inference target image on a basis of a result of the specification of the representative feature amount.

6. The inference device according to claim 1, wherein the processing circuitry compares representative feature amounts of a plurality of detection target objects having types and presence regions different from each other with the inference time feature amount, performs specification of a representative feature amount corresponding to the inference time feature amount among the representative feature amounts of the plurality of detection target objects, and recognizes each of a type and a presence region of a detection target object as recognition of the detection target object appearing in the inference target image on a basis of a result of the specification of the representative feature amount.

7. The inference device according to claim 1, wherein the learning model includes deep neural networks (DNNs), and
the processing circuitry provides the image signal to the DNNs and acquires the inference time feature amount from the DNNs.

8. An inference method comprising:
acquiring an image signal indicating an inference target image that is an image in which a detection target object appears in a case where one or more of a condition that a domain of the inference target image is different from a domain of a training image and a condition that a recognition task of the inference target image is different from a pre-learned task are satisfied;
providing the image signal to a learning model in which learning of the training image has been completed, and acquiring, from the learning model, an inference time feature amount that is obtained by combining a plurality of feature amounts of the detection target object appearing in the inference target image after each of the plurality of feature amounts is blurred; and
recognizing the detection target object appearing in the inference target image on a basis of a representative feature amount that is a registered feature amount of the detection target object appearing in an image for conversion in which each of a domain and a recognition task of the image is the same as that of the inference target image, and the inference time feature amount.

9. A non-transitory computer-readable medium storing a program including instructions that, when executed by a processor, causes a computer to execute a process, the process including:
to acquire an image signal indicating an inference target image that is an image in which a detection target object appears in a case where one or more of a condition that a domain of the inference target image is different from a domain of a training image and a condition that a recognition task of the inference target image is different from a pre-learned task are satisfied;
to provide the image signal to a learning model in which learning of the training image has been completed, and acquire, from the learning model, an inference time feature amount that is obtained by combining a plurality of feature amounts of the detection target object appearing in the inference target image after each of the plurality of feature amounts is blurred; and to recognize the detection target object appearing in the inference target image on a basis of a representative feature amount that is a registered feature amount of the detection target object appearing in an image for conversion in which each of a domain and a recognition task of the image is the same target as that of the inference target image, and the inference time feature amount.

* * * * *